(12) United States Patent
Little

(10) Patent No.: US 7,810,989 B2
(45) Date of Patent: Oct. 12, 2010

(54) COCKTAIL SHAKER

(76) Inventor: Anthony A. Little, 11880 28th St. North, St. Petersburg, FL (US) 37716

( * ) Notice: Subject to any disclaimer, the term of this patent is extended or adjusted under 35 U.S.C. 154(b) by 388 days.

(21) Appl. No.: 11/850,937

(22) Filed: Sep. 6, 2007

(65) Prior Publication Data

US 2009/0067281 A1    Mar. 12, 2009

(51) Int. Cl.
*B01F 11/00* (2006.01)
(52) U.S. Cl. .................................... 366/212; 366/215
(58) Field of Classification Search ................ 366/110, 366/111, 112, 114, 116, 208–219
See application file for complete search history.

(56) References Cited

U.S. PATENT DOCUMENTS

| | | | | |
|---|---|---|---|---|
| 1,085,450 | A * | 1/1914 | Lopez | 366/210 |
| 1,417,219 | A * | 5/1922 | Warren | 366/212 |
| 1,527,227 | A * | 2/1925 | Sanders | 366/212 |
| 1,960,640 | A * | 5/1934 | Lajeunesse | 366/215 |
| 2,034,902 | A | 3/1936 | Heinze | |
| 2,082,593 | A | 6/1937 | Pankotan | |
| 2,536,959 | A * | 1/1951 | Shaw | 366/209 |
| 3,030,082 | A | 4/1962 | Matzen et al | |
| 3,112,844 | A | 12/1963 | Keller et al | |
| 3,331,588 | A * | 7/1967 | Nasser | 366/211 |
| 3,735,964 | A * | 5/1973 | Lorenzen | 366/211 |
| 3,788,611 | A * | 1/1974 | Barbini | 366/208 |
| 4,445,782 | A | 5/1984 | Sparrow, Jr. | |
| 4,893,938 | A * | 1/1990 | Anderson | 366/208 |
| 5,697,701 | A * | 12/1997 | Forrest et al. | 366/110 |
| 5,906,433 | A | 5/1999 | Mazzalveri | |
| D483,982 | S | 12/2003 | Irvine | |
| 6,913,165 | B2 | 7/2005 | Linz et al. | |

(Continued)

FOREIGN PATENT DOCUMENTS

WO    2007/076708 A1 *    7/2007

OTHER PUBLICATIONS

John T. Derock et al, Automatic Martini Shaker, Georgia Institute of Technology, George W. Woodruff School of Mechanical Engineering, ME 4182 Capstone Design Spring Semester 2003, Apr. 23, 2003, 14 pages, downloaded from http://helix.gatech.edu/classes/me4182/2003S1/webs/Swordfish/fr.htm.

*Primary Examiner*—Charles E Cooley
(74) *Attorney, Agent, or Firm*—Christopher Paradies; Fowler White Boggs P.A.

(57) ABSTRACT

A cocktail shaker uses a motor to cause a container to be shaken. The shaker includes a following member coupled to a following device that is engaged in a directional mechanism, such as a slot or rod. The directional mechanism defines the path and angle of the motion imparted to the container. The throw is defined by the mechanism that transforms rotational motion of a motor to a shaking motion of the container. A mechanism for transforming rotational motion to a shaking motion may include a rotational member and an attachment member pivotally coupled to the rotational member on one end and coupled to the device holding the container on the other end. A combination of throw, path, and motor speed are capable of providing a mechanism for shaking the container that is similar to shaking the container by hand. For example, the motor speed and duration of shaking may be continuously variable or discretely selectable, which may be selected by the user.

21 Claims, 4 Drawing Sheets

U.S. PATENT DOCUMENTS 6,945,689 B2  9/2005  Armendariz et al.
6,945,690 B2  9/2005  Armendariz et al.
2009/0067281 A1* 3/2009 Little .......................... 366/209

* cited by examiner

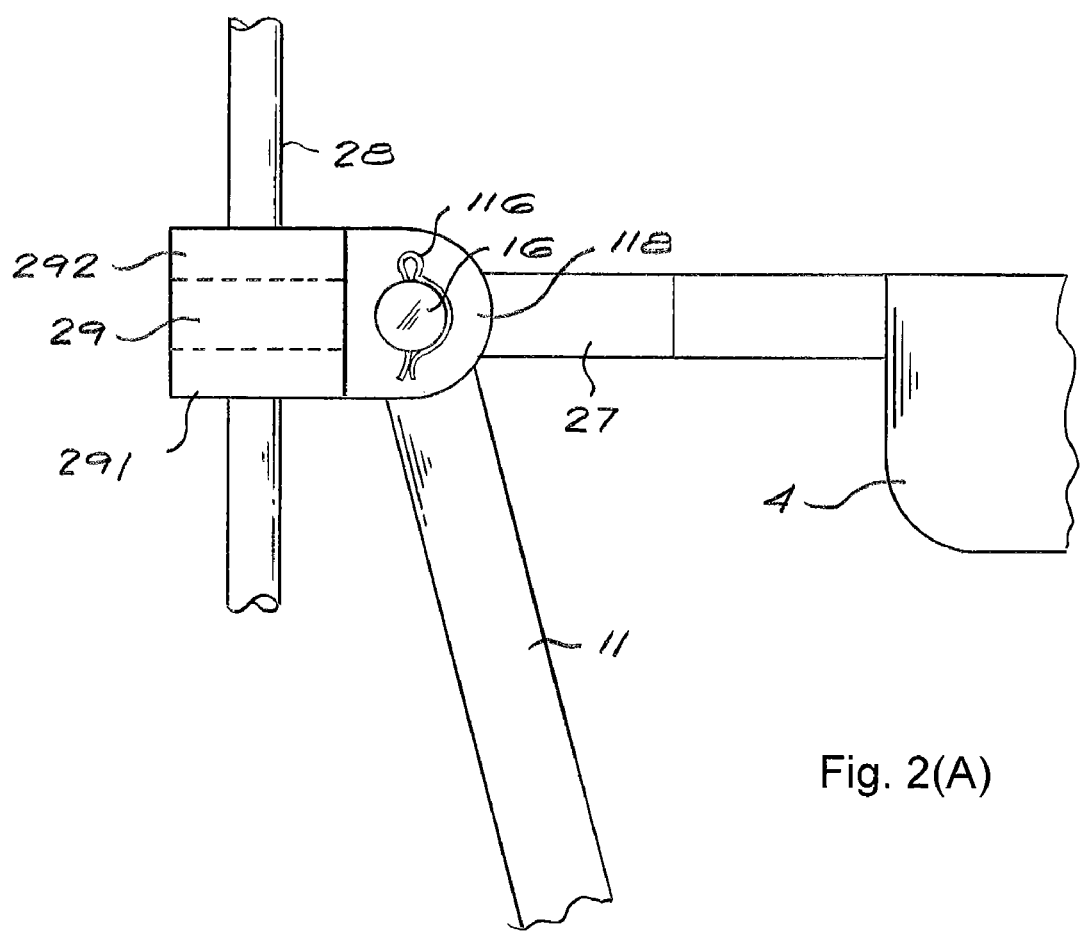
Fig. 2(A)
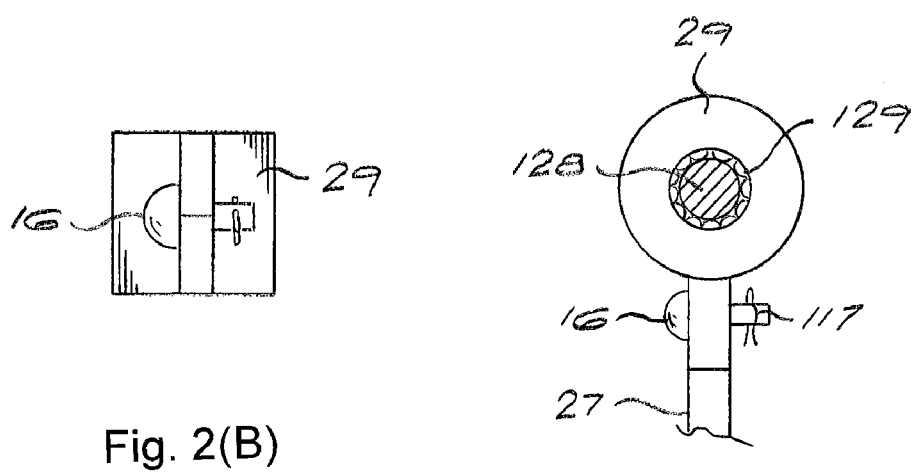
Fig. 2(B)
Fig. 2(C)

COCKTAIL SHAKER

FIELD OF THE INVENTION

The field relates to automatic cocktail shakers for shaking alcoholic beverages to prepare a chilled and mixed cocktail.

BACKGROUND OF THE INVENTION

The movement of a piston is one of the best known forms of transferring linear motion into rotary motion, which is present in internal combustion engines.

As an example of a motor used for mixing drinks, U.S. Pat. No. 3,030,082 illustrates a motor coupled to a rotating device and a linkage member attached to the rotating device for a drink mixing device by a first ball mechanism that causes not only a pivoting motion, but also a rotation of a heavy rotating member (labeled 26 in FIG. 2 of the reference) about the axis of a rod (labeled 18 in FIG. 2 of the reference). However, a directing mechanism in the example is formed by the rod (labeled 18) fixed to the top of a lid closing a container and a second ball mechanism (labeled 21 in FIG. 3 of the reference) disposed above the cap and articulating engaged in a stationary frame (labeled 14 in FIGS. 2 and 3 of the reference), which is fixed in position relative to the drink mixing device.

However, the motion induced by rotation of the motor in U.S. Pat. No. 3,030,082 is not a natural shaking motion. Instead, the rotary motion of the motor and movement of the rod through the second ball mechanism provides for a limited, rotation about the axis of the rod (labeled 18), a limited orbital motion of the top of the container, and a slightly greater orbital motion of the bottom portion of the container. The reference teaches that this motion is preferred for mixing of drinks, because it overcomes all of the disadvantages of prior art devices, including poor agitation, inefficient mixing, a need for internal agitators or beaters, complicated structure, intricacy, bulkiness and impractical costs to manufacture, while thoroughly mixing drinks. However, the reference teaches that thorough mixing within the container is only achievable by a combination of the orbital motion of the container and the rotational motion of the container about the axis of the rod, which is brought about by the swinging from side to side of a C-shaped member (labeled 26 in FIG. 2 of the reference). See col. 2, lines 30-48. Thus, this reference teaches away from a cocktail shaker having a more natural motion that replicates that of a hand mixed cocktail. The throw (i.e. the length of movement from beginning of movement in one direction to return movement in the opposite direction) is very limited in this example of a drink mixer and in other prior art mixers. Indeed, it could be argued that the orbital motion presents no abrupt change in direction, as occurs in a hand shaken drink. The reference teaches that the only abrupt change of direction occurs due to rotation of the container about its longitudinal axis (i.e. the axis of the rod) from the weight of the C-shaped member.

SUMMARY OF THE INVENTION

A cocktail shaker according to examples of the present invention provides an abrupt change in direction from an upward direction of travel to a downward direction of travel, and/or vice versa, which is a more natural shaking motion. An angle of travel to the vertical may be defined by a following member that determines the direction of travel of a container for mixing a cocktail. For example, a traditional container for shaking cocktails may be held in a holder that is driven by a linkage member by a rotating device attached to a motor. The motor may be electrical or any other type of motor. The linkage member transforms the rotary motion of the motor to a linear motion. The following member is coupled to a directional device that defines the direction of travel of the container held in the holder.

An advantage of one example is that the direction of travel of the container may be along an arcuate path. It is thought, without being limiting, that an arcuate path more nearly replicates the process of hand shaken cocktails.

Another advantage is that the throw of the container may be adequate to traverse ice from a bottom portion of the container to a top portion of the container. Yet another advantage is that the angle and the acceleration imposed on the container is selected such that the acceleration due to the upward motion is capable of displacing ice in the bottom of the container at the time that upward motion commences to a top portion of the container at a time when the direction of motion reverses. Yet another advantage is that the angle and acceleration due to gravity and downward motion is capable of returning ice and other contents of the container to the bottom of the container as the upward motion recommences. Preferably, the ice and other contents return to the bottom of the container prior to substantial acceleration recommencing in the upward direction, providing a natural shaking motion and superior mixing of the ingredients.

In one example, controls are provided to adjust the speed of the motor. For example, the controls may allow continuous adjustment of speed or may provide preset speeds, such as slow, medium and high. Controls may be provided for the duration of shaking, which may have continuous or discrete settings, also.

BRIEF DESCRIPTION OF DRAWINGS

FIGS. 2A-2C illustrate a detailed view of one example of a following mechanism coupled to a linkage mechanism.

DETAILED DESCRIPTION

Figure 1:
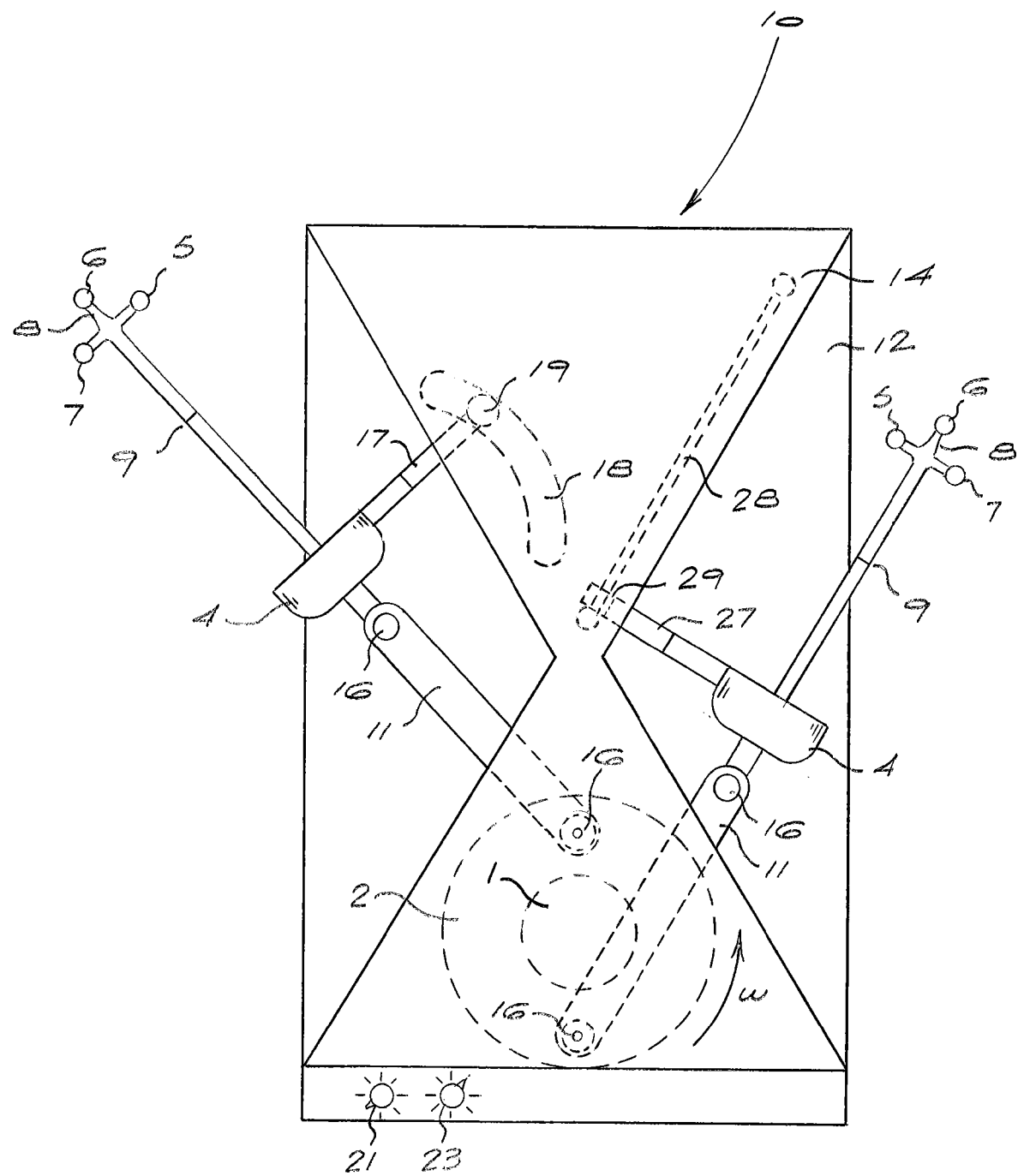
FIG. 1 illustrates examples of a mechanisms for a cocktail shaker.

As illustrated in FIG. 1, alternative embodiments of a cocktail shaker include a motor 1 capable of driving rotary motion of coupling members at pivot points 16, such that linkage members 11 are capable of driving a support cup 4 along a defined path. The path may be defined by a rod 28, slot 18 or other directing mechanism that is capable of defining a path for the motion of the cup 4, when acted on by the linkage member 11 pivotally coupled at pivot point 16 to a rotating device 2 rotated by the motor 1.

The motor 1 and rotating device 2 have many very well known examples and are illustrated schematically by dashed lines as internal parts of the cocktail shaker. The details of the design of the motor 1 and the rotating device 2 are well within the skill in the art. However, a cocktail shaker capable of replicating the mixing of hand shaking requires a greater throw than known shaking machines. Thus, the linkage member 11 is coupled to a rotating device 2 having a sufficient diameter to produce a fourteen centimeter throw, for example. Other throw distances may be sufficient to shake cocktails. The throw distance required depends on the length of the container used to mix the cocktails, the angle (or arcuate curvature) of the path, and the speed of the motor. The direction may be rapidly changed from up to down by the mechanism used to couple a traditional container for shaking cocktails to a rotary motion of the motor 1.

In one example, illustrated in FIG. 1, a traditional container for shaking cocktails is held by a cup 4, an adjustable member 9 attached at one end to the cup 4 and at an opposite end to a three-pronged cap holder. The three-pronged cap holder has a right prong 5 and a left prong 7 that holds a first cap in place on a traditional container, while a top prong 6 holds a second cap in place on a traditional container. As is known in the field, the second cap may be used as a measuring cup and a lid on the first cap, and the first cap may include a strainer for separating ice and other non-fluid ingredients within the traditional container for shaking cocktails, when the ingredients in the container have been shaken and are being decanted into a glass. The top prong 6 may be adjustably connected by a spring-loaded member 8 to the adjustable member 9, such that the second cap is held in place. Biasing mechanisms, such as springs, may be included within the adjustable member 9 and the spring-loaded member 8, providing a positive clamping bias on the first cap and the second cap by the respective prongs.

In one example, the cup 4 includes a biased base member that provides a clamping bias between the base member and the prongs. For example, the base member may be made of an elastic material, may include a biasing mechanism, or both. For example, a spring may provide an upward bias against a plate on which a natural or synthetic foam rubber material is disposed. Thus, a bottom portion of the traditional container may be positioned on the base member, pressed downward and positioned into the three-pronged cap holder. Thus, a person inserting the traditional container into to the holder of the cocktail shaker may do so using only one hand, for example.

In alternative examples, the direction of travel of the cup 4 is defined by following members 17, 27 coupled by a following device 19, 29 to a directional device 18, 28.

In one example illustrated on one side of FIG. 1, a slot following device 19 is coupled to a slot 18, such that the following member 17 directs the cup 4 along an arcuate path, when the linkage member 11 is driven by the rotary movement of the rotating member 2 by the motor 1.

In another example illustrated on the opposite side of FIG. 1, a rod 28 is coupled to a rod following device 29, such that the following member 27 moves up and down beside the rod 28. The angle of the rod 28 determines the angle of a traditional container held in the holder. In one example, the angle is thirty degrees to the vertical. The amount of displacement of ice within a traditional container depends on two factors, the angle of the container to the vertical (i.e. the direction of gravity) and the acceleration of the ice induced acceleration of the container during an upward motion and downward motion of the traditional container.

In one example, an arcuate path may provide less deceleration of the ice and contents during the terminal phase of the upward stroke, allowing further travel of the ice toward the top portion of the container. It is thought, without being limiting in any way, that an arcuate path provides for better mixing of contents, also. Shear forces induced by the change in angular velocity induced by the arcuate path might provide additional mixing of the contents within the container, for example. However, rapidly accelerating and decelerating ice moving between the top of the container and the bottom of the container is thought to provide adequate mixing of the ingredients with or without shear forces induced using an arcuate path. Nevertheless, an arcuate path is preferred, because it provides a more natural shaking action than a linear path, alone.

FIG. 2 illustrates an alternative example of coupling the linkage member 11 to the cup 4. In this example, the linkage member 11 is pivotally coupled at a pivot point 16, using a fastener 116 disposed through a hole 117 in a pin 16 to hold the pin 16 in a pivot member 118. The pivot member 118 may be integrally formed on a portion of the following device 29, such as a sleeve, which following device 29 is designed for low friction following along a rod 28 or a tube, wire or other rod-like member. The following device 29 is capable of defining the direction of travel of the following member 27, which is attached to the cup 4, as illustrated in FIG. 2A. FIG. 2B shows a side view of the following device 29 showing the pivot member 118, the pin 16 and the fastener 116. FIG. 2C is a top, partial cross sectional view, of a cross section of the rod 28 in contact with low friction ball bearings 129 of a following device 29. If ball bearings 129 are used, then one example includes two sets of ball bearings 129 at the top 292 and bottom 291 of the following device 29. By positioning the pivot point 16 of the linkage member 11 nearer to the following device 29, it is thought that the torque exerted on the following device 29 may be reduced. Alternatively, torque may be reduced by limiting the length of the following member 27. Also, the following device 29 may be made longer, such that the distance between the bottom 291 and the top 292 is extended.

Figure 3A:
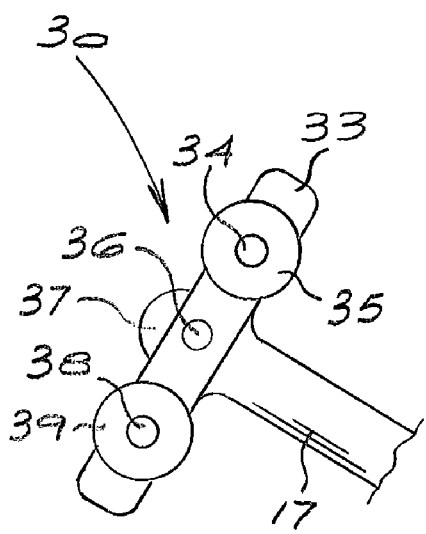
FIGS. 3A-3C illustrate a detailed view of another example of a following mechanism coupled to a linkage mechanism.
Figure 3B:
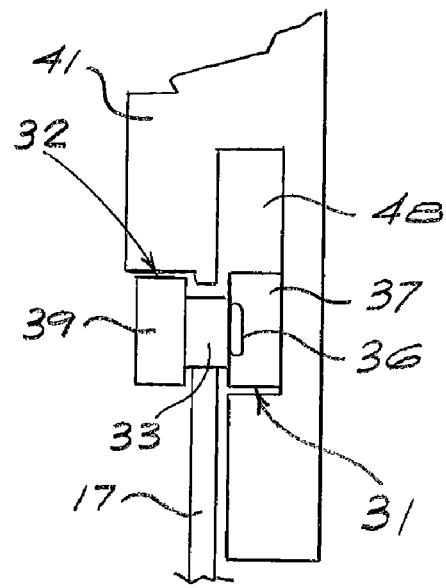
Figure 3C:
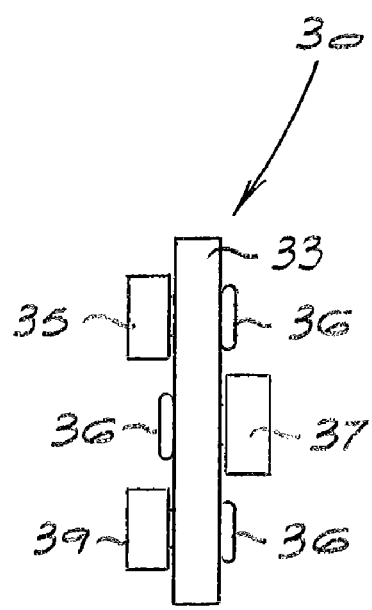

FIGS. 3A-3C illustrate a following mechanism 30 capable of engaging a slot, such as the slot shown in FIG. 3B. Three roller bearings 35, 37, 39 are rotatably mounted on a member 33. The member 33 is integrally formed with a following member 17. The following member 17 maintains a constant angle to an imaginary tangent line drawn tangentially to the curved surface at the point of contact between a roller bearing 37 and an arcuate contact surface of the slot 31. In this example, the arcuate contact surface 31 is in a plane offset from the plane of another contact surface 32, which makes contact with one or both of a pair of roller bearings 35, 39. In the example, the roller bearings 35, 37, 39 are attached to the member 33 by a fastener 36, such as a rivet, screw, bolt or any other fastener capable of coupling a roller bearing to the member.

Figure 4:
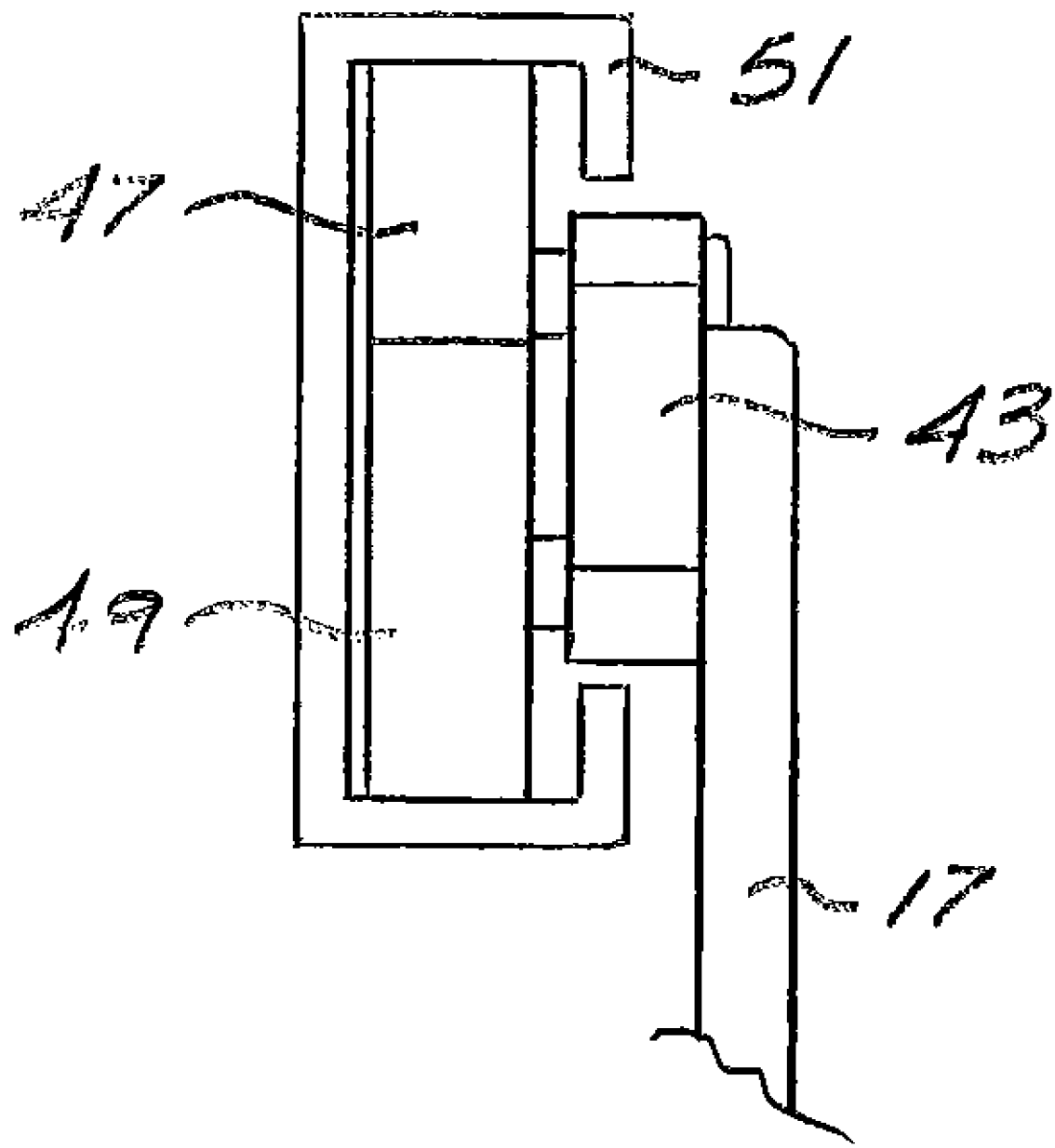
FIG. 4 illustrates a detailed view of an alternative example of a following mechanism.

As an alternative, FIG. 4 illustrates three roller bearings 47, 49 (one not visible in the side plan view) extending from a common side of a member 43. In this example, all three roller bearings are disposed in a C-shaped slot. The C-shaped slot in this example is formed by an extruded or deformation processed C-channel 51; however, a C-shaped slot may be formed in a casting, forging, machining or other processes known for forming channels of this shape.

The slot in either FIG. 4 or 3B may be arcuate or linear, and the following member 17 will be able to maintain an angle relative to a tangent line to the arcuate curve or line. Additional roller bearings may be added, such as a fourth roller bearing, which may provide some mechanical advantages and reliability, for example. By maintaining a fixed angle, the following member 17, which may be fixed to the cup 4 (at opposite end not shown), causes the cup 4 to follow the path of the arcuate or linear channel, for example.

What is claimed is:

1. A cocktail shaker for shaking a container containing cocktail ingredients, the cocktail shaker comprising:
   a holder for holding the container;
   a following member rigidly coupled to the holder;
   a following device rigidly coupled to the following member;

a directing mechanism coupled to the following device, such that the following device engages the directing mechanism and the directing mechanism limits the movement of the following device to a path defined by the directing mechanism;

a linkage member having a first end pivotally coupled to the holder and a second end opposite of the first end; and a rotary driving mechanism pivotally coupled to the second end of the linkage member, such that rotation of the rotary driving mechanism drives the following device along the path defined by the directing mechanism, wherein the holder comprises an extension member having a first end attached to a cup and a second end opposite of the first end; and a first prong, a second prong and a third prong, coupled to the second end of the extension member, such that the first prong and the second prong are positioned at two vertices of the base of an imaginary isosceles triangle and the third prong is positioned at the top of the imaginary isosceles triangle, the first prong, the second prong and the third prong extending outwardly such that a top portion of the container is engagable by the first prong, the second prong, the third prong or a combination of thereof, and the container is retained in the cup by a bias force applied between the cup and the first prong, the second prong, the third prong or a combination thereof.

2. The cocktail shaker of claim 1, wherein the path is arcuate.

3. The cocktail shaker of claim 1, wherein the path is linear.

4. The cocktail shaker of claim 1, wherein the directing mechanism is a rod, tube or cable.

5. The cocktail shaker of claim 4, wherein the directing mechanism is a rod.

6. The cocktail shaker of claim 1, further comprising a pivot member attached to the following device.

7. The cocktail shaker of claim 6, wherein the linkage member is pivotally attached to the pivot member.

8. The cocktail shaker of claim 1, wherein the third prong is adjustably connected by a spring-loaded member to the extension member.

9. The cocktail shaker of claim 1, wherein the extension member includes a biasing mechanism such that the length of the extension member is adjustable and a bias force is applied between the cup and the first prong and the second prong, when the container is held in the holder.

10. The cocktail shaker of claim 9, wherein the biasing mechanism is a spring.

11. The cocktail shaker of claim 1, wherein the cup includes a bias mechanism such a bias force is applied between the cup and the first prong, the second prong, the third prong or a combination thereof 12. The cocktail shaker of claim 11, wherein the bias mechanism comprises a spring.

13. The cocktail shaker of claim 12, wherein the bias mechanism further comprises an elastic material.

14. The cocktail shaker of claim 11, wherein the bias mechanism comprises a foamed elastic material.

15. The cocktail shaker of claim 1, wherein the directing mechanism comprises a slot or a tube.

16. The cocktail shaker of claim 15, wherein the directing mechanism comprises a slot.

17. The cocktail shaker of claim 16, wherein the following device engages the slot such that the holder follows an arcuate path displaced from the path defined by the slot, the arcuate path of the holder being the same arcuate curvature as the path defined by the slot.

18. The cocktail shaker of claim 17, wherein the following device includes a member having a first end having a first roller bearing coupled on the first end and a second end, opposite of the first end, having a second roller bearing coupled on the second end, such that the first roller and the second roller bearing each engage a portion of the slot.

19. The cocktail shaker of claim 18, wherein the member of the following device has a third roller bearing coupled to the member such that the roller bearing extends outwardly from an opposite side of the member than the first roller bearing and the second roller bearing.

20. The cocktail shaker of claim 19, wherein the slot includes a first arcuate surface capable of contacting the first roller bearing and the second roller bearing, but not the third roller bearing, and the slot includes a second arcuate surface capable of contacting the third rolling bearing, but not the first roller bearing and the second roller bearing, such that the angle of the following member has a fixed angle in relation to an imaginary tangent line drawn tangentially to the arcuate curvature of second surface at the point of contact between the second surface and the third roller bearing.

21. The cocktail shaker of claim 18, wherein the member of the following device has a third roller bearing coupled to the member such that the first roller bearing, the second roller bearing and the third roller bearing each extend outwardly from a side of the member, and the side is the same side for each of first roller bearing, the second roller bearing and the third roller bearing such that each is accommodated in a slot comprised of a C-shaped channel.

* * * * *